June 24, 1958     R. M. STANLEY     2,840,327
AIRCRAFT SAFETY BELT LATCH WITH PARACHUTE
RELEASE LANYARD ATTACHING MEANS
Filed Aug. 27, 1954     2 Sheets-Sheet 1
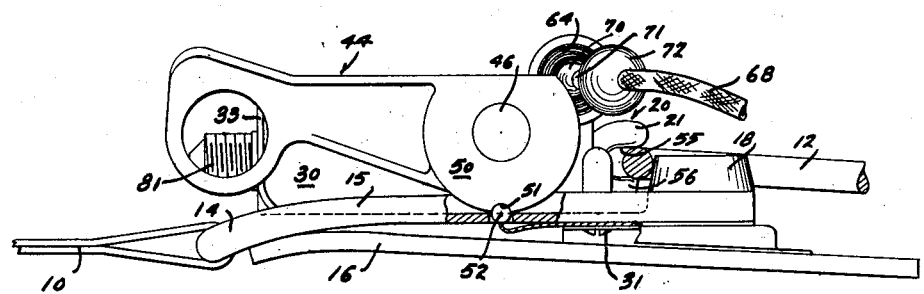
FIG. 1.
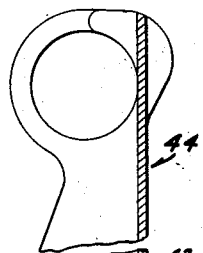
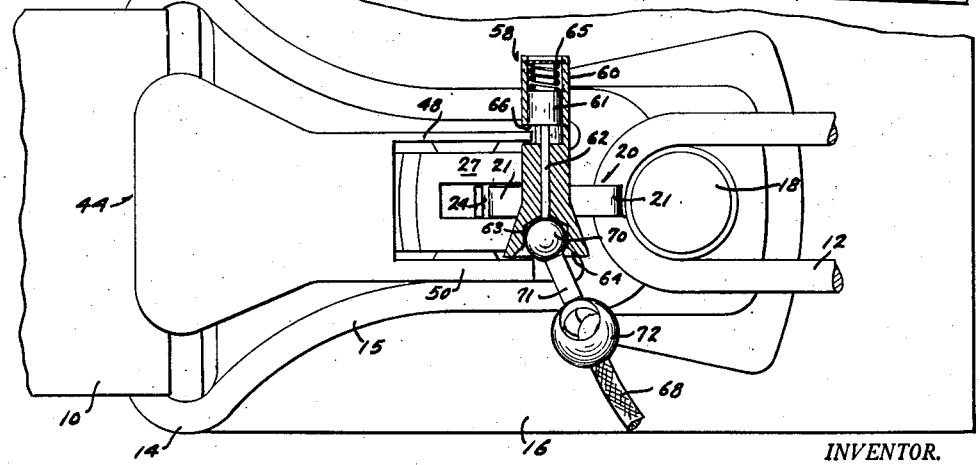
FIG. 3.
INVENTOR.
ROBERT M. STANLEY
BY
Bean, Brooks, Buckley & Bean.
ATTORNEYS INVENTOR.
ROBERT M. STANLEY
BY
Beau, Brooks, Buckley & Beau.
ATTORNEYS United States Patent Office 2,840,327
Patented June 24, 1958

2,840,327

AIRCRAFT SAFETY BELT LATCH WITH PARA-
CHUTE RELEASE LANYARD ATTACHING
MEANS

Robert M. Stanley, Buffalo, N. Y., assignor to Stanley
Aviation Corporation, Buffalo, N. Y.

Application August 27, 1954, Serial No. 452,577

9 Claims. (Cl. 244—122)

This invention relates in general to aircraft safety devices, and more particularly to novel safety belt devices such as are particularly useful in connection with ejection type aircraft seats.

It is a principal object of the present invention to provide an improved safety belt latch and release mechanism which is normally operated manually but which is automatically released incidental to operation of the seat ejection mechanism.

Another object is to provide means whereby the safety belt can not be latched about the waist of the aircraft crewman as a normal incident to entering the aircraft, unless coincident therewith he also fastens his parachute release lanyard to the safety belt.

Furthermore, another object of the invention is to provide an improved safety belt arrangement whereby the latch mechanism thereof incorporates means rendering it necessary for the crewman to effect a connection thereto of his parachute lanyard, thereby precluding inadvertent omission of that most vital procedure, intermediately of the safety belt latch closing operation such as is normally performed by the crewman as he first enters the aircraft.

Furthermore, another object of the invention is to provide an improved combination safety belt latch and parachute lanyard connection device as aforesaid which is conveniently adapted to be manually actuated by a crewman easily with his two hands.

Another object of the invention is to provide a combination safety belt latch and parachute lanyard connection device as aforesaid, which is so constructed that the safety belt latch mechanism thereof may not be fully closed by the crewman until the parachute lanyard connection has been secured.

Still another object of the invention is to provide a combination safety belt latch and parachute lanyard connection device as aforesaid, whereby whenever the safety belt latch is manually released, so as to permit normal exit of the crewman from the aircraft, the parachute lanyard is automatically disconnected therefrom without attention by the operator.

Still another object of the invention is to provide a mechanism as aforesaid which is of structurally simplified and rugged form; relatively inexpensive to manufacture and assemble; and fool-proof in operation and inexpensive to maintain in good working condition.

Other objects of the invention will appear in the specification hereinafter.

The invention contemplates generally, a novel combination safety belt latch and parachute lanyard connection device, wherein the safety belt latch mechanism is of such form as to be conveniently manipulated manually between belt-closed and belt-opened positions, while being at the same time adapted to be automatically actuated from closed to open positions under emergency seat ejection conditions as will be explained more fully hereinafter. The mechanism also incorporates a parachute lanyard connection means adapted to receive the free end of the parachute lanyard in firmly connected relation intermediately of the safety belt latch closing operation. Thus, when the crewman takes his seat, he first draws together the two ends of the safety belt latch device and places them in coacting position. He thereupon inserts the free end of the parachute lanyard into the connection mechanism; and then he completes the latch closing operation so as to lock the safety belt in holding position and to simultaneously lock the parachute lanyard to the safety belt per se. The device is so arranged that unless the parachute lanyard is so connected to the belt latch mechanism intermediately of the operation of closing thereof, the belt latch mechanism may not be fully closed. Hence, the crewman is positively reminded that the parachute lanyard must be so connected to the device, and the risk that the crewman might otherwise overlook attachment of the lanyard to some fixed structure is thereby obviated. Hence, if he subsequently, under emergency conditions, jettisons himself and his seat out of the aircraft, following which the safety belt latch is opened so as to permit the crewman to fall free from the seat, the release lanyard of his parachute pack is thereupon automatically pulled so as to cause the parachute to open for slowing his descent, as is well known in the art.

One exemplification of the invention is illustrated in the accompanying drawings wherein:

Fig. 1 is a side elevation of a combination safety belt latch and parachute lanyard connection device of the present invention, showing the device in closed position with the parachute lanyard firmly connected thereto;

Fig. 2 is a longitudinal sectional view, on an enlarged scale, showing the belt latch device in manually actuated open position;

Fig. 3 is a top plan view, partly in section, of the mechanism as shown in Fig. 1;

Figure 4:
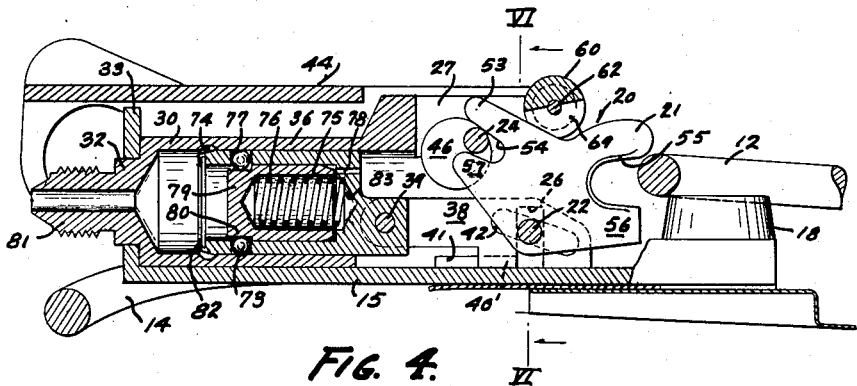
Fig. 4 is a sectional view corresponding to Fig. 2, but showing the belt latch device in manually closed but pressure-released positions.

As illustrated in the drawings, the invention may be incorporated in connection with a safety belt such as may conveniently comprise two parts adapted to be drawn around the waist of the aircraft crewman for holding him in seated position in an aircraft seat or the like. As shown in the drawings at Figs. 1 and 3, one end of the belt is indicated at 10, and the eye-shaped portion of a bail, firmly secured to the other end of the seat belt, is indicated at 12. The end belt portion 10 loops through the eye portion 14 of a base plate member 15 to which is fastened a flexible base flap 16 formed of leather or the like to abridge the gap between the end portions of the safety belt when the device is in holding position about the waist of the crewman. The base plate 15 includes at its forward end an upstanding post 18 about which the eye portion 12 of the other end of the belt is adapted to slip-fit for interlocking connection.

To hold and/or release the eye-shaped portion 12 from the post 18, a floating hook member 20 is movably mounted upon the base plate 15 by means of a pair of pivot pins 22, 24. The hook member is formed with a retaining arm 21 and a cam arm 56 separated by means of a slot 55. The pivot pin 22 is in fixed relation with the floating hook 20 and extends on opposite sides thereof into opposed slots designated 26—26 formed in bifurcated bracket portions 27—27 formed integrally with a control barrel 30 which is fixed to the base plate 15 by means of screws 31 at the forward end of the barrel and by means of a slip-fitted shoulder connection as indicated at 32 with a rear upstanding portion 33 of the base plate 15. The barrel 30 is cylindrically bored to accommodate in slide-fitting relation therein an actuating piston 36 to the forward end of which are pivotally connected a pair of links 38—38, by means of a pivot pin 39. The forward ends of the links 38 are so proportioned as to bear in sliding engagement with the upper surface of the bed plate 15 and each of them is provided with an outwardly extending bearing lug 40 which engages with a groove 41 formed in each of the inner faces of the bifurcated bracket portions 27, whereby the links 38 are held in reciprocal manner. Each of the links is formed in its forward end with a slot 42 which is inclined backwardly and upwardly, each of which is engaged by the pivot pin 22, whereby when the actuating piston is moved forwardly within the cylinder barrel 30 the pivot pin 22 will be elevated and the hook member will rock about the pivot 24, thereby releasing the eye-shaped portion of the belt bail from its engagement with the post 18.

My device is provided with a handle 44 which is mounted upon an actuating shaft 46. This shaft is rotatably mounted in the bifurcated bracket portions 27 and it is formed with two bifurcated ends 48 and 50. These ends are preferably circular in form in side view, and the end 50 is formed in its periphery with a notch 51 which engages a spring-pressed detent ball 52 when the handle is in its closed position, to prevent unintended movement. The pin 24 forms a part of the shaft 46 and is eccentrically arranged as shown in Figs. 2 and 4. The hook member 20 is provided with arms 53 and 57 between which is formed an actuating slot 54 which engages the pin 24. As will be seen by reference to Fig. 2 this pin is in its lower position when the handle is in its open position. The parts of my device are so proportioned that when occupying the positions shown in Fig. 2 the front end of the hook member will be elevated and the slot 55 thereof will be raised above the level of the post 18, thereby releasing the eye-shaped portion 12 of the belt bail. During such movement the arm 56 will serve to elevate the bail. Oscillatory movement of the hook member during the manual operation thereof is about the center of the pin 22 which is held in the position shown in Fig. 2 when the manual control is actuated.

In order to make it impossible for the crewman to close the latching device before the chute lanyard is in position, I provide detent means 58 comprising a cylinder 60 in which is mounted a piston 61. The cylinder is carried by the bracket portions 27 and extends across the upper portion of the mechanism. The piston 61 is formed with a piston rod 62 which extends through the detent means and into a recess 63 formed in the bell mouth 64 thereof. A spring 65 is mounted back of the piston 61 so as to urge it toward locking position. A slot 66 is formed in the side wall of the cylinder 60 for passage of the end of the arm 48 into the cylinder when the handle is moved to its final closed position. The chute lanyard as indicated at 68 carries at its free end a key device terminating in a ball shaped end portion 70 for insertion in the recess 63 of the cylinder 60 to press against the rod 62 so as to displace the piston 61 against the spring action as to the position shown in Fig. 3 so as to uncover the slot 66 and to permit the arm 48 of the handle to move to its closed position. The end portion 70 is formed with a stem 71 connecting it to a connection member 72 to which the lanyard is secured.

Figure 5:
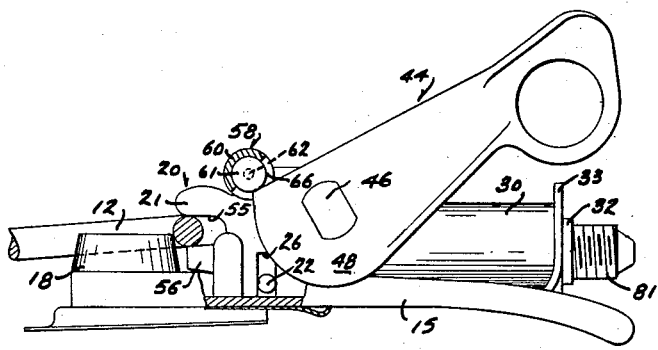
Fig. 5 is an opposite side elevational view showing the belt latch mechanism in partially closed position, awaiting insertion of the parachute lanyard connection device prior to complete closing of the latch mechanism.
Figure 6:
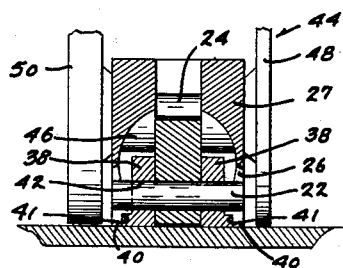
Fig. 6 is a fragmentary section taken along line VI—VI of Fig. 4.

As shown in Fig. 5, when the lanyard key is not in place as shown in Fig. 3 the piston 61 of the detent means is in such position that it acts as an abutment against full closing movement of the handle 44, the top surface of the arm 48 of the handle bearing against the piston and preventing full closing of the handle until the key ball 70 is forced into the mouth of the cylinder to move the piston 61 rearwardly to uncover the slot 66. The curved shaped end portion of the arm 50, as shown in Fig. 1, extends over the key ball 70 when in closed position thereby holding it in the position shown in Figs. 1 and 3, thereby securely holding the lanyard to the mechanism. The cylinder 60 is formed with a slot 69 therein to avoid interference with movement of the retaining arm 21 of the hook member 20.

So as to lock the actuating piston 36 within the control barrel 30 during manual operations of the device, a series of lock balls 73 are provided which are arranged in suitable slots 77 formed through the wall of the actuating piston and engaging suitable recesses 74 formed in the bore of the control barrel. These balls are held in locking position as shown in Fig. 2 by means of a locking piston 79 which is mounted in a suitable bore formed in the actuating piston 36. This locking piston is formed with an axial bore 75 in which there is mounted a helical spring 76 one end of which bears against the bottom of the bore, and the other end of which is mounted in and bears against the bottom of a recess 83 formed in the end wall of the actuating piston. An aperture 78 is formed in the end wall of the actuating piston for the escape of air when the locking piston is actuated. The locking piston is formed with a reduced portion 80 which is so proportioned that when the piston is moved under gas pressure exerted through the nozzle 81 as explained hereinafter, the lock balls 73 will be released from engagement with the recesses 74 and will permit the actuating cylinder to be moved forwardly within the bore of the control barrel. As shown in Figs. 2 and 4 the lock piston is restrained against outward movement within the actuating piston by means of a lock ring 82.

It will be understood that the actuating piston is operated only by means of the gas pressure exerted upon the locking piston and upon the actuating piston when released. Furthermore, it will be obvious that such actuation is only during the time the eye-shaped portion of the belt bail is held in engagement with the post 18 by virtue of the eccentric position of the pin 24 on the actuating shaft 46. When the handle 44 is in its closed position, the pin 24 will be in the position shown in Fig. 4; and it will be seen by reference to this figure that the links 38 have been moved forwardly by the actuating piston under gas pressure, which will cause the pin 22 to be elevated within the slots 26 by reason of the camming action of the inclined slots 42 of the links. During such elevating movement of the pin 22, the pin 24 will act as the pivot for the hook member 20. As the hook member is rotated about the piston pin 24, its forward end is elevated and the eye-shaped portion 12 of the bail will be released from the slot 55 and thereby become disengaged from the post 18.

From the foregoing it will be understood that the safety belt mechanism of the invention is designed so that the crewman, when entering the aircraft and lowering himself into his seat will, by force of habit, first draw the two ends of the safety belt about him and hook the bail member 12 onto the post 18 while the latch handle 44 is in upright or open position, as shown in Fig. 2. He will then naturally try to close the handle 44, but at first will only be able to lower it part way as to the position shown in Fig. 5. At this time, the hook portion 21 will have lowered sufficiently to temporarily hold the bail 12 upon the post 18, but the handle 44 will not yet go to fully closed position because of interference by the piston 61 with the arm portion 48 of the handle. This will remind the crewman that he must first insert the parachute lanyard key device into the latch mechanism before he may fully close the safety belt latch.

Consequently, it will then be necessary for him to press the ball portion 70 of the key device into the bell shaped opening of the cylinder 60, thereby depressing the piston rod 62 until the piston 61 is displaced sufficiently to uncover the slot 66, whereupon the control handle 44 may be pressed down into fully closed position. This latter operation may be easily effected by the crewman by squeezing down on the handle 44 with one hand while handling the lanyard key with his other hand. Thus, it is prerequisite to final closing of the safety belt latch that the parachute pull lanyard be firmly connected to the seat belt. Then, when the crewman prepares a normal exit from the aircraft he simply pulls upwardly upon the handle 44. This automatically disconnects the lanyard from the safety belt and simultaneously opens the safety belt latch so that he may get up out of his seat and leave the aircraft with his parachute pack still fastened to his back, in the usual manner. On the other hand, in event of an emergency during flight requiring ejection of the seat and its occupant from the aircraft, after the seat and its occupant have cleared the aircraft, the mechanism supplying gas pressure to the connection 81 will be actuated (in accord with prior inventions forming no part of the present invention). Thus, the piston 36 will be displaced to the right as to the position shown in Fig. 4 whereupon the safety belt latch releases the bail 12 from the post 18 so that the belt separates and the crewman is freed from the seat. As he falls away from the seat, the parachute lanyard (being still fixed to the latch mechanism which stays with the seat) is thereby pulled upon, whereby the parachute pack opens to slow the descent of the crewman to the ground.

Whereas, only one form of the invention has been illustrated and described in detail herein, it will be apparent to those skilled in the art that the invention is not so limited but that various changes may be made therein without departing from the spirit of the invention or the scope of the appended claims.

I claim:

1. In combination, a safety belt including an end portion terminating in a bail, a latch mechanism for said belt adapted for manual and gas pressure actuation, said latch comprising a base, an attachment post carried by said base for engagement with the eye portion of said safety belt bail, a hook member carried by said base and having a detent slot movable relative to said post to lock and unlock said bail, manual lever means pivotally mounted upon said base and operably connected for actuating said hook member, separate gas pressure actuating means carried by said base and operably connected for pivoting said hook member, and said hook member being mounted for independent actuation upon an eccentric pivot carried by the manual actuating means and also upon a pivot carried by the pressure actuated means.

2. In combination, a safety belt including an end portion terminating in a bail, a latch mechanism for said belt adapted for manual and gas pressure actuation, said latch comprising a base plate, an attachment post carried by said base for engagement with the eye portion of said safety belt bail, a hook member carried by said base and having a detent slot movable relative to said post to lock and unlock said bail, manual means pivotally mounted upon said base and operably connected for actuating said hook member, separate gas pressure responsive means carried by said base and operably connected for actuating said hook member, a pivot pin carried by said hook member for pivotal support of said member when oscillating between belt-open and belt-closed positions responsive to actuation of the manual actuating means, and a pin carried by said manual means for pivotal support of said hook member upon actuation thereof by said gas pressure means.

3. In combination, a safety belt including an end portion terminating in a bail, a latch mechanism for said belt, comprising a base, an attachment post carried by said base for engagement with the eye portion of said safety belt bail, a hook member pivotally mounted upon said base and having a detent slot movable toward and away from said post to lock and unlock said bail, said hook member having an actuating slot, an actuating handle carried by said base plate, a shaft mounted upon said base and arranged for pivotally mounting said handle, an actuating pin carried by said shaft to rotate with the latter while in engagement with the actuating slot of said hook member, detent means carried by said base plate and engageable with said handle to positively prevent closing thereof until released, and pressure actuated release means independent of said actuating handle.

4. In combination, a safety belt including an end portion terminating in a bail, a latch mechanism for said belt, said latch comprising a base, an attachment post carried by said base for engagement with the eye portion of said safety belt bail, a hook member pivotally mounted upon said base and having a detent slot movable relative to said post to lock and unlock said bail, said hook member having an actuating slot, an actuating handle carried by said base, a shaft mounted upon said base and arranged for pivotally mounting said handle, an actuating pin carried by said shaft to rotate with the latter while in engagement with the actuating slot of said hook member, and detent means carried by said base and engageable with said handle to positively prevent closing thereof until released.

5. In combination, a parachute opening lanyard having a key fixed to the free end thereof, and a safety belt, a latch mechanism for said safety belt comprising a base plate, an attachment post carried by said base plate for engagement with the eye portion of a safety belt bail, a hook member pivotally mounted upon said base plate and having a detent slot movable relative to said post to lock and unlock said bail, said hook member having an actuating slot, an actuating handle carried by said base plate, a shaft rotatably mounted upon said base and arranged for pivotally mounting said handle, an actuating pin carried by said shaft for rotation therewith while in engagement with the actuating slot of said hook member, detent means carried by said base plate and consisting of a cylinder having an opening through a side wall portion thereof for receiving a portion of said actuating handle in projecting relation therethrough, a spring-pressed piston for normally closing said opening against entrance of said handle portion into said cylinder, said key being adapted to be slip fitted into said cylinder to displace said piston to uncover said opening to permit said handle to project therethrough and to move to its closed position, and means carried by said handle to retain said key in firmly held position in said cylinder until said handle is subsequently manually actuated to open said piston.

6. A safety belt device having two belt end portions for detachable interconnection, said belt device including a base plate attached to one end of said belt, a bail attachment post fixed to extend from said base plate for latching engagement with the eye portion of a safety belt bail, a hook member pivotally mounted upon said base plate and having a detent slot movable relative to said post to lock and unlock said bail, an eccentric crank pin rotatably mounted upon said base plate, said hook member having an actuating slot engaged with said crank pin, and a handle pivoted upon said base plate and manually operable for actuating said crank pin.

7. A latch mechanism for safety belts, comprising a base plate, an attachment post carried by said base plate for engagement with the eye portion of a safety belt bail, a bifurcated bracket fixed to said base plate, said bracket being formed with a substantially vertical slot, a pivot pin mounted in said slot for vertical movement therein, a hook member pivotally mounted upon said pin for movement within said bracket, a control barrel carried by said bracket, an actuating piston slidably mounted within said barrel, a pair of links carried by said piston, at opposite sides thereof each link being formed with an upwardly and backwardly inclined slot for engagement with said pivot pin, means for normally locking said piston, and pressure actuated means operably connected for releasing said piston locking means and for displacing said piston to actuate said links to operate said hook member to release the safety belt.

8. A latch mechanism for safety belts, comprising a base plate, an attachment post carried by said base plate for engagement with the eye portion of a safety belt bail, a bifurcated bracket fixed to said base plate, said bracket being formed with a substantially vertical slot, a pivot pin mounted in said slot for vertical movement therein, a hook member pivotally mounted upon said pin for movement within said bracket, a control barrel carried by said bracket, an actuating piston slidably mounted within said barrel, a link carried by said piston, said link being formed with an upwardly and backwardly inclined slot for engagement with said pivot pin, means for locking said actuating piston in its retracted position, and a locking piston slidably mounted within said actuating piston and coacting with said locking means, said means being so arranged that pressure upon said locking piston will free said actuating piston lock to permit said actuating piston to move to operate said links and said hook member to release the safety belt.

9. A latch mechanism for safety belts, comprising a base plate, an attachment post fixed to said base plate for latching engagement with the eye portion of a safety belt bail, a hook member pivotally mounted upon said base plate and having a detent slot movable relative to said post to lock and unlock said bail, a crank pin movably carried by said base plate, said hook member having an actuating slot engageable with said crank pin, a handle for actuating said crank pin, detent means engageable with said handle when in initial closed position to block further closing thereof, key means displaceable carried upon said base plate for releasing said detent means only when said key means is in operative position to permit said handle to be moved to fully closed position, a parachute pull lanyard secured to said key, and said handle having means for engaging said detent key when in its detent releasing position, whereby said key and said lanyard will be secured to said latch mechanism when said operating handle is in its fully closed position.

References Cited in the file of this patent
UNITED STATES PATENTS

| | | |
|---|---|---|
| 967,713 | Blom | Aug. 16, 1910 |
| 1,038,624 | Messick | Sept. 17, 1912 |
| 1,408,501 | Clement | Mar. 7, 1922 |
| 1,955,876 | Ferguson | Apr. 24, 1934 |
| 2,113,338 | Wohldorf | Apr. 5, 1938 |
| 2,429,761 | Ketel | Oct. 28, 1947 |
| 2,494,207 | Sabbia | Jan. 10, 1950 |
| 2,559,962 | Hudson | July 10, 1951 |
| 2,586,847 | Mead | Feb. 26, 1952 |
| 2,763,451 | Moran | Sept. 18, 1956 |